United States Patent
Yoshitoku et al.

(10) Patent No.: US 7,517,574 B2
(45) Date of Patent: Apr. 14, 2009

(54) OPTICAL RECORDING MEDIUM AND METHOD FOR MANUFACTURING THE SAME

(75) Inventors: Daisuke Yoshitoku, Tokyo (JP); Koji Mishima, Tokyo (JP); Kenji Yamaga, Tokyo (JP)

(73) Assignee: TDK Corporation, Tokyo (JP)

( * ) Notice: Subject to any disclaimer, the term of this patent is extended or adjusted under 35 U.S.C. 154(b) by 525 days.

(21) Appl. No.: 11/232,889

(22) Filed: Sep. 23, 2005

(65) Prior Publication Data

US 2006/0078706 A1 Apr. 13, 2006

(30) Foreign Application Priority Data

Sep. 30, 2004 (JP) ............................. 2004-287686

(51) Int. Cl.
*B32B 3/02* (2006.01)
(52) U.S. Cl. .................... 428/64.1; 428/64.4; 428/64.5; 430/270.12
(58) Field of Classification Search ................ 428/64.1, 428/64.4; 430/270.12
See application file for complete search history.

(56) References Cited

U.S. PATENT DOCUMENTS

| 5,972,458 | A | * | 10/1999 | Raychaudhuri et al. | .... 428/64.1 |
|---|---|---|---|---|---|
| 6,153,063 | A | * | 11/2000 | Yamada et al. | ......... 204/192.22 |
| 2005/0237894 | A1 | * | 10/2005 | Mishima et al. | ............... 369/94 |
| 2005/0244753 | A1 | * | 11/2005 | Mishima et al. | ........ 430/270.12 |
| 2006/0222810 | A1 | * | 10/2006 | Hayashi et al. | ............. 428/64.4 |
| 2007/0178270 | A1 | * | 8/2007 | Yoshitoku et al. | .......... 428/64.1 |
| 2007/0202291 | A1 | * | 8/2007 | Mishima et al. | ............. 428/64.4 |

FOREIGN PATENT DOCUMENTS

| JP | A 61-190734 | | 8/1986 |
|---|---|---|---|
| JP | A 63-023235 | | 1/1988 |
| JP | A-63-237993 | | 10/1988 |
| JP | 02219689 A | * | 9/1990 |
| JP | A 6-93300 | | 11/1994 |
| JP | 2006116948 A | * | 5/2006 |

\* cited by examiner

*Primary Examiner*—Elizabeth Mulvaney
(74) *Attorney, Agent, or Firm*—Oliff & Berridge, PLC

(57) ABSTRACT

An inexpensive optical recording medium is provided that can ensure recording and reproduction of data even in case of using blue or blue-violet laser light as irradiation light and can be stored for a long time. The optical recording medium includes a recording layer. The recording layer includes a recording portion and a covering portion covering at least one side of the recording portion in a thickness direction of the recording portion. The recording portion and the covering portion are substantially formed from a plurality of types of common constituent elements. Composition ratios of the constituent elements are different between the recording portion and the covering portion.

6 Claims, 3 Drawing Sheets

OPTICAL RECORDING MEDIUM AND METHOD FOR MANUFACTURING THE SAME

BACKGROUND OF THE INVENTION

1. Field of the Invention

The present invention relates to an optical recording medium in which a recording layer is optically changed by irradiation with laser light, thereby recording data onto the recording layer, and a method for manufacturing such an optical recording medium.

2. Description of the Related Art

Optical recording media such as a CD (Compact Disc) and a DVD (Digital Versatile Disc) are widely used as information recording media. In recent years, an optical recording medium has attracted attention that enables recording of a larger amount of information with higher density by using blue or blue-violet laser light as irradiation light. Moreover, recording capacity of the recording medium can be increased by employing multilayer recording in which a plurality of recording layers are formed with light-transmitting spacers interposed therebetween.

Optical recording media are roughly classified into a ROM (Read Only Memory) type in which writing and rewriting of data cannot be performed, an R (Recordable) type which allows data to be recorded only once, and an RW (Rewritable) type in which data can be rewritten. A recording layer of the R-type optical recording medium should have optical characteristics that can be changed by irradiation with laser light. Moreover, it is important that the recording layer is durable or hardly degrades during long-term storage. As a material for the recording layer of the R-type optical recording medium, an organic dye was widely used conventionally. The organic dye conventionally used was a material that hardly absorbed ultraviolet rays and visible light rays having short wavelengths such as blue rays, and blue-violet rays that could accelerate chemical reaction. This properties contributed to suppression of the degradation of the recording layer.

However, the conventionally used organic dye hardly absorbed the visible light rays having short wavelengths such as blue and blue-violet rays. Thus, in case of using blue or blue-violet laser light as irradiation light, satisfactory change of optical characteristics could not be obtained and therefore recording of data could not be performed. Moreover, it was difficult to develop an organic dye that could provide satisfactory change of optical characteristics even in case of using blue or blue-violet laser light as irradiation light and hardly degraded during long-term storage.

On the other hand, an R-type optical recording medium is known that uses an inorganic material such as an oxide of Bi, Mo, Cu, Ag, or Pd, for a material of a recording layer (see Japanese Patent Laid-Open Publications Nos. 2003-48375 and 10-334507, for example). A part of the above inorganic materials can provide satisfactory change of optical characteristics even in case of using blue or blue-violet laser light as irradiation light, and hardly degrades by ultraviolet rays and visible light rays having short wavelengths such as blue or blue-violet rays that can accelerate chemical reaction. However, even when the above inorganic materials were used, the recording layer degraded by moisture contained in a substrate or moisture entering from the outside through the substrate or a covering layer in some cases.

The degradation of the recording layer can be suppressed by forming a dielectric layer or the like (through which moisture hardly permeates) on each side of the recording layer. However, forming of the dielectric layer or the like makes the structure of the optical recording medium more complicated and increases the number of steps for manufacturing the optical recording medium. This results in increase of the cost of the optical recording medium. Moreover, in case of forming the recording layer of the inorganic material or forming the dielectric layer or the like, an expensive vapor deposition apparatus such as a sputtering apparatus has to be used. However, in order to form the recording layer or the dielectric layer or the like from different materials, it is necessary to use a plurality of vapor deposition apparatuses in accordance with the number of types of the materials. As a result, the cost of the optical recording medium also increases largely.

SUMMARY OF THE INVENTION

In view of the foregoing problems, various exemplary embodiments of this invention provide an inexpensive optical recording medium, which ensures recording and reproduction of data even in case of using blue or blue-violet laser light as irradiation light and which can be stored for a long time.

Various exemplary embodiments of the invention achieve the foregoing object by an optical recording medium includes a recording layer. The recording layer includes a recording portion and a covering portion covering at least one side of the recording portion in a thickness direction of the recording portion. The recording portion and the covering portion are substantially formed from a plurality of types of common constituent elements and composition ratios of the plurality of types of common constituent elements are different between the recording layer and the covering layer. Since the covering portion having properties that are harder to degrade by moisture than the recording portion covers one side or both sides of the recording portion, degradation of the recording layer by moisture can be suppressed. Moreover, since the recording portion and the covering portion are formed from common constituent elements, those portions are deposited by means of a common vapor deposition apparatus by adjusting deposition conditions. Thus, a manufacturing cost is low.

Accordingly, various exemplary embodiments of the present invention provide an optical recording medium comprising:

a substrate; and a recording layer formed over the substrate, the recording layer having its optical characteristics changed by irradiation with laser light, wherein the recording layer includes a recording portion and a covering portion that covers at least one side of the recording portion in a thickness direction of the recording portion, the recording portion and the covering portion are substantially formed from a plurality of types of common constituent elements, and composition ratios of the constituent elements are different between the recording portion and the covering portion.

Moreover, various exemplary embodiments of the present invention provide a method for manufacturing an optical recording medium comprising a recording layer deposition step of depositing a recording layer over a substrate by vapor deposition, the recording layer having its optical characteristics changed by irradiation with laser light, wherein the recording layer deposition step includes:

a recording portion deposition step of depositing a recording portion substantially formed from a plurality of types of constituent elements; and a covering portion deposition step of depositing a covering portion on at least one side of the recording portion in a thickness direction of the recording portion before and/or after the recording portion deposition step, the covering portion being substantially formed from the plurality of types of constituent elements that are common to the recording portion, composition ratios of the plurality of types of constituent elements being different between the recording portion and the covering portion, and the recording portion deposition step and the covering portion deposition step are performed by using a common vapor deposition apparatus.

DETAILED DESCRIPTION OF THE PREFERRED EMBODIMENTS

Various exemplary embodiments of the present invention are now described in detail, with reference to the drawings.

Figure 1:
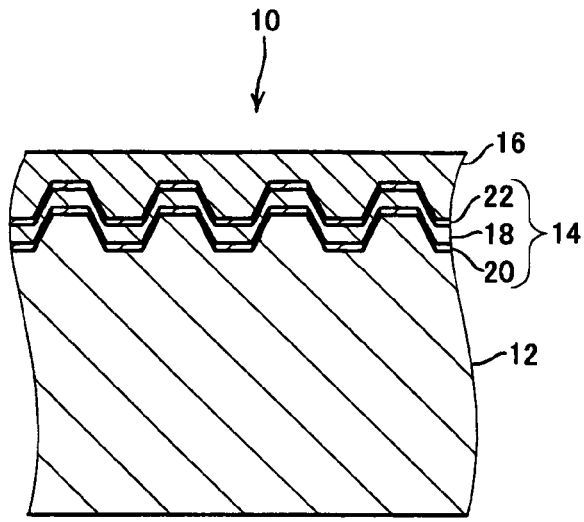
FIG. 1 is a schematic cross-sectional side view showing the structure of an optical recording medium according to the first exemplary embodiment of the present invention.

As shown in FIG. 1, an optical recording medium 10 according to a first exemplary embodiment of the present invention includes a substrate 12, a recording layer 14, and a cover layer 16. The recording layer 14 and the cover layer 16 are formed over one surface of the substrate 12 in that order. The optical recording medium 10 is an R type optical disc in which optical characteristics of the recording layer 14 are changed by irradiation with laser light, and has a feature in the structure of the recording layer 14. The optical recording medium 10 is a circular plate having an outer diameter of approximately 120 mm and a thickness of approximately 1.2 mm.

The substrate 12 has a thickness of approximately 1.1 mm and has grooves for tracking formed on its surface over which the recording layer 14 is formed. Examples of the material for the substrate 12 include polycarbonate resin, acrylic resin, epoxy resin, polystyrene resin, polyethylene resin, polypropylene resin, silicone resin, fluororesin, ABS resin, and urethane resin.

The recording layer 14 includes: a recording portion 18; a first covering portion 20 covering a substrate 12 side of the recording portion 18 in a thickness direction of the recording portion 18; and a second covering portion 22 covering a cover layer 16 side of the recording portion 18. The recording layer 14 is formed in a concavo-convex pattern that follows a concavo-convex pattern on the substrate 12. The recording portion 18, the first covering portion 20, and the second covering portion 22 are substantially formed from a plurality of types of common constituent elements. Composition ratios of those constituent elements are different among the recording portion 18, the first covering portion 20, and the second covering portion 22. The first covering portion 20 and the second covering portion 22 have properties that are harder to degrade by moisture than the recording portion 18.

More specifically, the recording portion 18, the first covering portion 20, and the second covering portion 22 are substantially formed of Bi and O. Please note that the phrase "the recording portion 18 is substantially formed of Bi and O" means that a ratio of a total atomic number of Bi and O to an atomic number of all atoms forming the recording portion 18 is 80% or more. It is preferable that the ratio of the total atomic number of Bi and O to the atomic number of all atoms forming the recording portion 18 be 90% or more. This is the same for the first covering portion 20 and the second covering portion 22. Moreover, it is preferable that a ratio of an atomic number of O to the total atomic number of Bi and O in each of the first covering portion 20 and second covering portion 22 be smaller than that in the recording portion 18. In order to obtain satisfactory change of optical characteristics by irradiation with laser light, it is preferable that atomic number of O in the recording portion 18 be 62% or higher with respect to number of all atoms constituting the recording portion 18. Specifically, it is preferable that the ratio of the atomic number of O to the total atomic number of Bi and O in the recording portion 18 be 62% or more. It is still preferable that the ratio of the atomic number of O to the total atomic number of Bi and O in the recording portion 18 be 63% or more. In addition, it is preferable that the recording portion 18 be thicker than the first covering portion 20 and the second covering portion 22 in order to obtain good optical characteristics. However, the first covering portion 20 and/or second covering portion 22 can be made thicker than the recording portion 18, if satisfactory change of optical characteristics of the recording portion 18 can be obtained by irradiation with recording laser light.

The cover layer 16 has a thickness of approximately 100 μm. Resins that can be cured by irradiation with energy beams and have a light-transmitting property, such as acrylic UV-curable resins and epoxy UV-curable resins, can be used as a material for the cover layer 16. Please note that the term "energy beams" is used to collectively mean electromagnetic waves such as ultraviolet rays and particle beams such as electron beams that have properties that can cure a particular resin in a fluid state, for example. A light-transmitting film may be used for the cover layer 16.

An operation of the optical recording medium 10 is now described.

In the optical recording medium 10, the first and second covering portions 20 and 22 each have properties that are hard to degrade by moisture. In addition to this, both sides of the recording portion 18 are covered with the first and second covering portions 20 and 22, respectively. Thus, it is hard for moisture in the substrate 12 or moisture entering from the outside through the substrate 12 or the cover layer 16 to reach the recording portion 18. Therefore, the degradation of the recording portion 18 can be suppressed. That is, it is hard for the recording layer 14 as a whole to be degraded and therefore the recording layer 14 can keep good quality during long-term storage. When the thickness of each of the first and second covering portions 20 and 22 is 1 nm or more, an effect of protecting the recording portion 18 can be achieved to a certain degree. It is preferable that the thickness of each of the first and second covering portions 20 and 22 be 3 nm or more in order to ensure the effect of protecting the recording portion 18. It is more preferable that the thickness be 5 nm or more.

Since the recording portion 18, the first covering portion 20, and the second covering portion 22 that form the recording layer 14 are formed from common constituent elements, deposition of the recording layer 14 can be easily performed, as described later, and the cost can be kept low. Incidentally, it is preferable that the thickness of each of the first and second covering portions 20 and 22 be 30 nm or less in view of production efficiency. It is more preferable that the thickness of each of the first and second covering portions 20 and 22 be 10 nm or less.

Since the recording layer 14 is substantially formed of Bi and O, satisfactory change of optical characteristics can be obtained even in the case where blue or blue-violet laser light is used as irradiation light. Thus, data can be surely recorded and reproduced. Although the recording portion 18 is mainly responsible for recording of data in the recording layer 14, each of the first and second covering portions 20 and 22 can also be responsible for recording of data when composition ratios of Bi and O in each of the first and second covering portions 20 and 22 are appropriately adjusted. More specifically, as the composition ratios of Bi and O in the covering portion 20 or 22 are closer to that in the recording portion 18, that covering portion 20 or 22 can also be responsible for recording of data. On the other hand, as a ratio of O is smaller in the covering portion 20 or 22, that covering portion 20 or 22 is not responsible for recording of data. Instead, its properties that are hard to degrade by moisture are improved. The composition ratios of the constituent elements in the recording portion 18, the first covering portion 20, and the second covering portion 22 can be determined in an appropriate manner in accordance with required quality and the like. More specifically, an example is considered in which a ratio of an atomic number of O to a total atomic number of Bi and O in each of the first and second covering portions 20 and 22 is different from that in the recording portion 18 by about 3% to about 20%.

Figure 2:
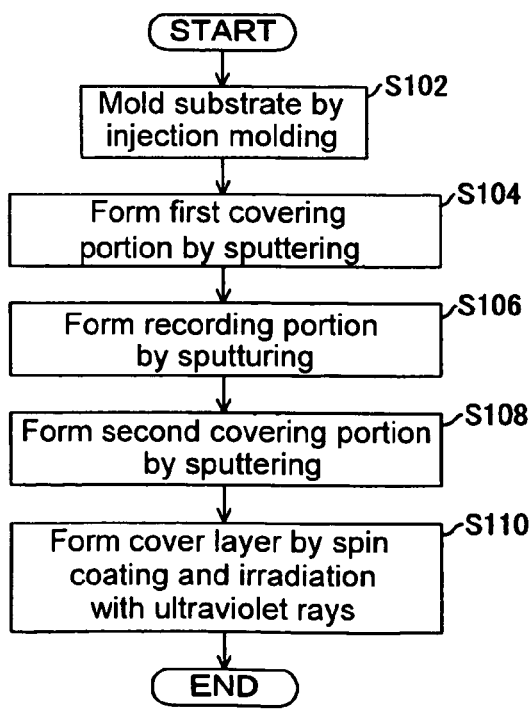
FIG. 2 is a flowchart generally showing a manufacturing method of the optical recording medium.

Next, an exemplary method for manufacturing the optical recording medium 10 is now described, with reference to a flowchart shown in FIG. 2.

First, a substrate 12 in the shape of a circular plate having an outer diameter of approximately 120 mm and a thickness of approximately 1.1 mm is molded by injection molding (S102). In this molding, a concavo-convex pattern of grooves is formed on one surface of the substrate 12.

Figure 3:
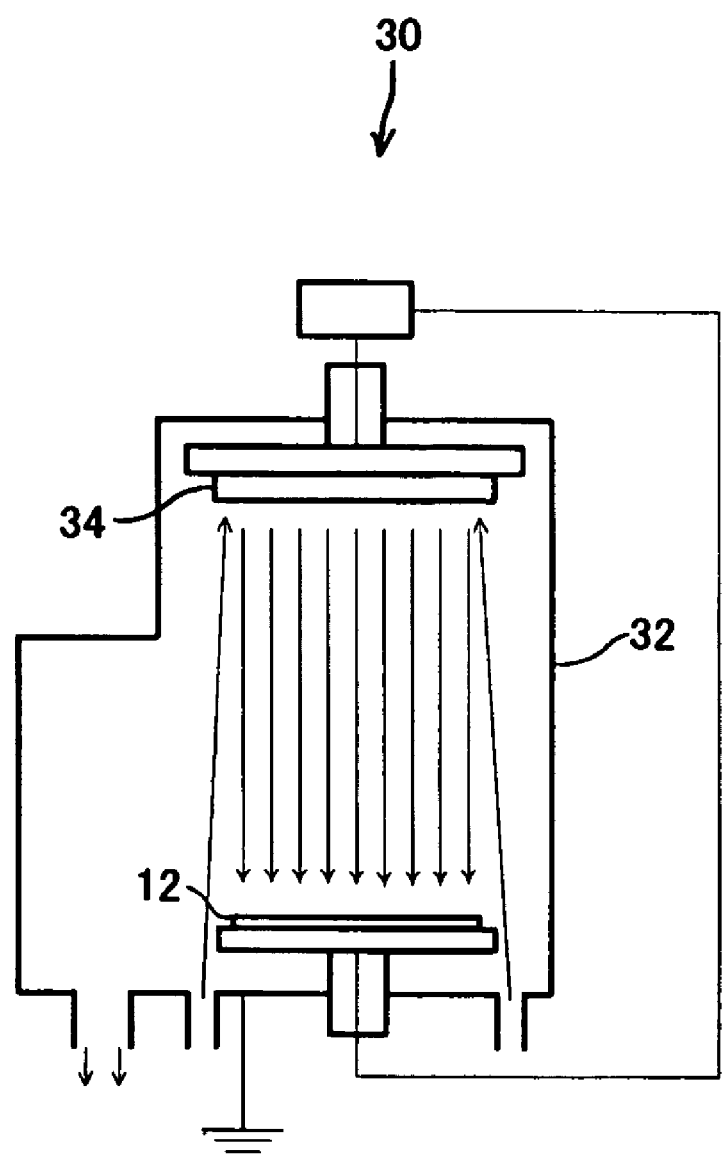
FIG. 3 is a schematic cross-sectional side view showing the general structure of a sputtering apparatus used for deposition of a recording layer of the optical recording medium.

Next, the first covering portion 20 is formed on the surface of the substrate 12 on which the grooves are formed (S104). More specifically, as shown in FIG. 3, the substrate 12 is placed inside a chamber 32 of a sputtering apparatus 30 in which a Bi target 34 is provided. When $O_2$ gas and sputtering gas such as Ar or Xe gas are supplied into the chamber 32 so as to cause collision of the sputtering gas with the Bi target 34, Bi particles are scattered by collision and are deposited on the substrate 12 while being oxidized by reaction with $O_2$ inside the chamber. As a result, the first covering portion 20 is formed to have an approximately uniform thickness and follow the concavo-convex pattern of grooves. Ratios of Bi and O in the first covering portion 20 can be adjusted by adjusting a sputtering condition (a deposition condition) such as a flow rate of $O_2$ gas and a deposition power. It is preferable that the recording layer 14 be mainly formed of Bi and O. However, a small amount of another element or compound can be mixed into the recording layer 14. It is preferable that an atomic number of the other element or compound be less than 20% of the number of all the atoms forming the recording layer 14. When the thickness of the first covering portion 20 reaches a predetermined thickness, sputtering is temporarily stopped.

Then, a recording portion 18 is formed on the first covering portion 20 (S106). More specifically, formation of the recording portion 18 uses the sputtering apparatus 30 used in deposition of the first covering portion 20. The recording portion 18 is formed under a different sputtering condition such as the flow rate of supplied $O_2$ gas and the deposition power from that of deposition of the first covering portion 20. It is preferable that a thickness of the recording portion 18 be 15 to 80 nm in order to obtain good signal characteristics. When the recording portion 18 reaches a predetermined thickness, sputtering is temporarily stopped.

Then, the second covering portion 22 is formed on the recording portion 18 (S108). More specifically, the second covering portion 22 is formed by means of the sputtering apparatus 30 used in deposition of the first covering portion 20 and the recording portion 18 under a different sputtering condition such as the flow rate of supplied $O_2$ gas and the deposition power from those of deposition of the first covering portion 20 and the recording portion 18. When a thickness of the second covering portion 22 reaches a predetermined thickness, sputtering is stopped. It is preferable that a total thickness of the recording portion 18, the first covering portion 20, and the second covering portion 22 be 16 to 120 nm, more preferably, 40 to 80 nm. When formation of the second covering portion 22 is finished, deposition of the recording layer 14 is finished.

Finally, a cover layer 16 is spread on the recording layer 14 to have a thickness of 100 μm by spin coating and is then cured by irradiation with energy beams such as ultraviolet rays (S110). The cover layer 16 may be formed by bonding a film that is manufactured in advance onto the recording layer 14. In this manner, manufacturing of the optical recording medium 10 is completed.

As described above, the recording portion 18, the first covering portion 20, and the second covering portion 22 are formed from common constituent elements. Therefore, the recording portion 18, the first covering portion 20, and the second covering portion 22 can be deposited by means of the common sputtering apparatus 30 (vapor deposition apparatus) by adjusting the sputtering conditions resulting in a low manufacturing cost.

In the above exemplary embodiment, the recording layer 14 in the optical recording medium 10 is substantially formed of Bi and O. However, the constituent elements of the recording layer are not specifically limited, as long as the recording layer can be formed that includes the recording portion and the covering portion covering the recording portion, the recording portion and the covering portion being substantially formed from a plurality of types of common constituent elements, the composition ratios of the constituent elements being different between the recording portion and the covering portion, the covering portion having properties that are harder to degrade by moisture than the recording portion. For example, the present invention can also be applied to an optical recording medium including a recording layer formed of O and another metal element such as Ag, Cu, Pd, Ni, Pt, or Zn, an optical recording medium including a recording layer formed of O and a plurality of metal elements from Bi, Ag, Cu, Pd, Ni, Pt, Zn, and the like, and an optical recording medium including a recording layer formed of N and one or more metal elements from Bi, Ag, Cu, Pd, Ni, Pt, and Zn.

In case of a recording layer formed of Ag and/or Cu and O, it is preferable that a ratio of an atomic number of O to a total of an atomic number of Ag and/or Cu and the atomic number of O in a recording portion be 1/3 or more in order to obtain satisfactory change of optical characteristics by irradiation with recording laser light. In case of a recording layer formed of O and any one of Pd, Ni, and Pt, it is preferable that a ratio of an atomic number of O to a total of an atomic number of Pd, Ni, or Pt and the atomic number of O in a recording portion be 1/2 or more in order to obtain satisfactory change of optical characteristics by irradiation with recording laser light. In case of a recording layer formed of Zn and O, it is preferable that a ratio of an atomic number of O to a total of an atomic number of Zn and the atomic number of O in a recording portion be 1/2 or less in order to obtain satisfactory change of optical characteristics by irradiation with recording laser light.

Figure 4:
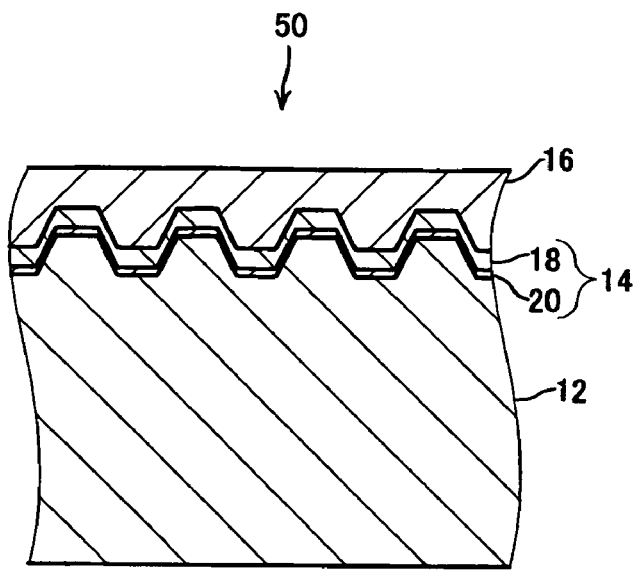
FIG. 4 is a schematic cross-sectional side view showing the structure of an optical recording medium according to a second exemplary embodiment of the present invention.
Figure 5:
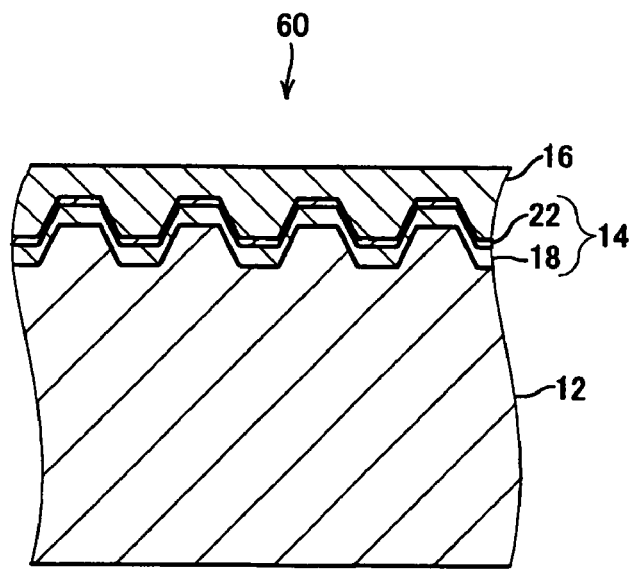
FIG. 5 is a schematic cross-sectional side view showing the structure of an optical recording medium according to a third exemplary embodiment of the present invention.

In the above exemplary embodiment, both sides of the recording portion 18 are covered with the first covering portion 20 and the second covering portion 22 in recording layer 14, respectively. However, the effect of suppressing the degradation of the recording layer 14 can also be achieved to a certain degree in an optical recording medium 50 according to a second exemplary embodiment of the present invention shown in FIG. 4, and in an optical recording medium 60 according to a third exemplary embodiment of the present invention shown in FIG. 5. In the second exemplary embodiment, the optical recording medium 50 has a structure in which only the substrate 12 side of the recording portion 18 is covered with the first covering portion 20. In the third exemplary embodiment, the optical recording medium 60 has a structure in which only the cover-layer 16 side of the recording portion 18 is covered with the second covering portion 22. Moreover, in the case where the cover layer 16 is thinner than the substrate 12 as in the optical recording medium 10, it is preferable to cover the cover-layer 16 side of the recording portion 18 with the covering portion.

In the above exemplary embodiment, only the recording portion 18, the first covering portion 20, and the second covering portion 22 that are formed from common constituent elements are provided between the substrate 12 and the cover layer 16. Moreover, a reflective layer or the like formed from different constituent elements from those of the recording portion 18, the first covering portion 20, and the second covering portion 22 may be further provided between the substrate 12 and the cover layer 16.

In the above exemplary embodiment, sputtering is temporarily stopped after deposition of the first covering portion 20 and after deposition of the recording portion 18 during deposition of the recording layer 14, thereby intermittently depositing the first covering portion 20, the recording portion 18, and the second covering portion 22. Alternatively, the first covering portion 20, the recording portion 18, and the second covering portion 22 may be continuously deposited while the deposition condition is continuously adjusted. In this case, the composition ratios of Bi and O continuously change around boundaries between the first covering portion 20 and the recording portion 18 and between the recording portion 18 and the second covering portion 22. This is advantageous because peeling of the first covering portion 20, the recording portion 18, and the second covering portion 22 at the boundaries hardly occurs. On the other hand, when the first covering portion 20, the recording portion 18, and the second covering portion 22 are intermittently deposited as in the above exemplary embodiment, an advantageous effect is achieved that the first covering portion 20, the recording portion 18, and the second covering portion 22 having the highly precise composition ratios of the constituent elements can be obtained. It can be appropriately determined in accordance with required performance and the like which one of the above deposition methods is employed.

In the above exemplary embodiment, sputtering is used for depositing the first covering portion 20, the recording portion 18, and the second covering portion 22. Alternatively, another vapor deposition method such as a chemical vapor deposition method may be used for depositing the first covering portion 20, the recording portion 18, and the second covering portion 22, as long as the respective composition ratios of the constituent elements can be adjusted to desired values.

In the above exemplary embodiment, the optical recording medium 10 is a single-layer recording type in which only one recording layer 14 is formed. Moreover, the present invention can also be applied to a multilayer recording type optical recording medium in which a plurality of recording layers and spacer layers are alternately formed.

In the above exemplary embodiment, the optical recording medium 10 is a one-sided recording type in which information can be recorded onto only one side of the medium. Moreover, the present invention can also be applied to a two-sided recording type optical recording medium having recording layers formed on both sides.

In the above exemplary embodiment, the optical recording medium 10 has a structure in which the cover layer 16 is thinner than the substrate 12. Moreover, the present invention can also be applied to an optical recording medium in which a substrate and a cover layer have the same thickness like DVD.

WORKING EXAMPLES

A plurality of optical recording media, in which a recording layer 14 was formed of Bi and O and one side or both sides of a recording portion 18 was/were covered with the first covering portion 20 and/or the second covering portion 22, were manufactured in the manner described in the above exemplary embodiments.

The manufacturing method is now described in detail. First, a plurality of substrates 12 formed of polycarbonate resin were fabricated to have a thickness of 1.1 mm and a diameter of 120 mm by injection molding.

Then, those substrates 12 were placed in a sputtering apparatus one by one, and the recording portion 18 and the first covering portion 20 and/or the second covering portion 22 were deposited on each substrate 12. A deposition power applied to a Bi target and flow rates of Ar gas and $O_2$ gas were set as shown in Table 1, thereby adjusting ratios of Bi and O in each of the recording portion 18 and the first covering portion 20 and/or the second covering portion 22.

TABLE 1

| | Composition ratio (at %) | | Gas flow rate (sccm) | | Deposition power (W) |
|---|---|---|---|---|---|
| | Bi | O | Ar | $O_2$ | |
| Second covering portion | 32 | 68 | 50 | 13 | 200 |
| Recording portion | 27 | 73 | 50 | 25 | 200 |
| First covering portion | 32 | 68 | 50 | 13 | 200 |

Finally, UV-curable acrylic resin was applied onto recording layer 14 by spin coating and was spread to have a thickness of 100 μm. The UV-curable acrylic resin was then cured by irradiation with ultraviolet rays. The specific structures of the resultant optical recording media are shown in Table 2.

TABLE 2

| First covering portion O = 68% | Recording portion O = 73% Thickness (nm) | Second covering portion O = 68% | 8T C/N value (dB) Before high-Temperature and high-humidity test | 8T C/N value (dB) After high-temperature and high-humidity test | Optimum recording power (mW) Before high-temperature and high-humidity test | Optimum recording power (mW) After high-temperature and high-humidity test | Amount of change |
|---|---|---|---|---|---|---|---|
| 10 | 40 | — | 52.3 | 46.8 | 5.0 | 8.0 | +3.0 |
| — | 40 | 10 | 55.1 | 52.1 | 5.0 | 7.0 | +2.0 |
| 5 | 40 | 5 | 59.0 | 56.0 | 4.0 | 6.0 | +2.0 |
| 10 | 40 | 10 | 58.8 | 55.7 | 4.0 | 6.0 | +2.0 |
| 20 | 40 | 20 | 52.5 | 50.2 | 3.0 | 3.0 | 0.0 |

An optimum recording power and 8 T C/N value were measured for those optical recording media. Then, those optical recording media were left under an environment of high temperature and high humidity in which the temperature was 80° C. and the relative humidity was 85% for approximately 50 hours and thereafter the optimum recording power and the 8 T C/N value were measured again. More specifically, those optical recording media were placed in an optical recording medium estimation apparatus DDU1000 (manufactured by Pulstec Industrial Co., Ltd.) one by one, and recording marks each having a length of 8 T were formed in the recording layer 14 in each optical recording medium while a recording power Pw of laser light was gradually increased from 3 mW to 10 mW. In this manner, data was recorded. Other conditions were set as follows.

Wavelength of Laser light: 405 nm
Numerical aperture (NA) of an objective lens: 0.85
Modulation method: (1, 7) RLL
Recording linear velocity: 5.3 m/sec
Channel bit length: 0.12 μm
Channel clock: 66 MHz
Recording method: On-groove recording
Reproduction power: 0.7 mW
Intermediate power: 2.0 mW
Base power: 1.0 mW Jitter values were measured for those recording marks. The recording power of laser light Pw used for forming the recording mark that provided the minimum jitter value was measured as the optimum recording power.

Next, a laser beam was irradiated on each optical recording medium by means of the aforementioned optical recording medium estimation device under the following condition, thereby reproducing the recording mark having the length of 8 T recorded in the recording layer. The degree of modulation and a C/N value were then measured for a reproduced signal. Spectrum analyzer XK180 (manufactured by Advantest Corporation) was used in measurement of the C/N value. The reproduction condition was set as follows.

Wavelength of laser light: 405 nm
Reproduction power Pr: 0.7 mW
Numerical aperture of an objective lens NA: 0.85

The measurement results are also shown in Table 2.

A method for examining composition ratios of constituent elements and the thickness for each of the recording portion 18, the first covering portion 20, and the second covering portion 22 is now described.

First, the cover layer 16 is removed and then the recording layer 14 is coated with a carbon layer having a thickness of about 20 nm. The recording layer 14 with the carbon coating is then cut in a thickness direction by FIB (Focused Ion Beam) method, so that the width of the cut recording layer 14 in a direction along the surface is about 70 nm. In this manner, a cross-sectional TEM sample is prepared. For example, FB2100 (manufactured by Hitachi High-Technologies Corporation) can be used for preparation of the sample.

The thus prepared sample is observed at a plurality of positions in the thickness direction (of the recording layer 14) with TEM (Transmission Electron Microscope) and is also analyzed with EDS (Energy-Dispersive x-ray Spectroscopy). As a result, a profile (i.e., a graph obtained by plotting a relationship between the positions in the sample in the thickness direction of the sample and composition ratios of constituent elements) is obtained. For example, FE-TEM (JEM-2100F: manufactured by JEOL Ltd.) or FE-STEM (HD2000: manufactured by Hitachi High-Technologies Corporation) can be used in that measurement. In the thus obtained profile, a ratio of an atomic number of Bi to a total atomic number of Bi and O is approximately constant in each of three regions in the thickness direction that correspond to the recording portion 18, the first covering portion 20, and the second covering portion 22, respectively. Moreover, the ratio of the atomic number of Bi drastically changes around each of the boundaries between the respective regions. A site near each of the boundaries between the respective regions, at which the composition ratio of Bi is approximately equal to an arithmetic average of the composition ratios of Bi in the adjacent regions, was determined as the boundary between the recording portion 18 and the first covering portion 20 or the second covering portion 22. Based on this, the thickness of each of the recording portion 18, the first covering portion 20, and the second covering portion 22 was calculated.

Alternatively, a needle-like sample may be prepared by cutting the recording layer 14 in such a manner that the width of the sample at one surface (in a direction along that surface) is about 100 nm and the width at the other surface is wider than that at the one surface. Then, the composition ratios of the constituent elements in the sample may be measured at a plurality of positions in the thickness direction (of the recording layer 14) by TOF-MS (Time Of Flight Mass Spectrometry) using APFIM (Atom Probe Focused Ion Beam Microscope). Even in the case where analysis of a composition ratio of an atomic number of oxygen is difficult, the composition ratio of oxygen can be calculated by measuring a composition ratio of an element other than oxygen in the above manner.

COMPARATIVE EXAMPLES

A plurality of optical recording media each having a recording layer in which composition ratios of Bi and O were constant throughout the recording layer were manufactured, unlike the above exemplary embodiment. Except for the above, the optical recording media of Comparative Example were the same as the optical recording medium of the above exemplary embodiment. The specific structures of those optical recording media of Comparative Example are shown in Table 3.

portion 22 than in the case where the substrate side of the recording portion 18 is covered with the first covering portion 20.

TABLE 3

| | | 8T C/N value (dB) | | Optimum recording power (mW) | | |
|---|---|---|---|---|---|---|
| Recording layer O = 68% Thickness (nm) | Recording layer O = 73% | Before high-Temperature and high-humidity test | After high-temperature and high-humidity test | Before high-temperature and high-humidity test | After high-temperature and high-humidity test | Amount of change |
| 40 | — | 45.0 | 43.5 | 8.5 | 11.5 | +3.0 |
| — | 40 | 50.9 | 24.0 | 5.0 | 12.0 | +7.0 |
| — | 130 | 44.0 | 41.2 | 2.5 | 2.5 | 0.0 |

For each of those optical recording media, an optimum recording power and 8 T C/N value were measured as in Working Examples described above. Then, those optical recording media were left under an environment of high temperature and high humidity in which the temperature was 80° C. and the relative humidity was 85% for approximately 50 hours. Then, the optimum recoding power and 8 T C/N value were measured again for each of those optical recording media. The measurement results are also shown in Table 3.

As shown in Tables 2 and 3, change of the optimum recording power and change of the 8 T C/N value between before and after the high-temperature and high-humidity test were smaller in the optical recording media of Working Examples in which the recording portion 18 was covered with the first covering portion 20 and/or the second covering portion 22 than the optical recording media of Comparative Examples in which the composition ratios of constituent elements were constant throughout the recording layer. That is, it was confirmed that degradation of the recording elements during storage was more suppressed in the optical recording media of Working Examples, as compared with that in the optical recording media of Comparative Examples.

Moreover, when the optical recording media of Working Examples were compared with each other, it was confirmed that the change of the optimum recording power and the change of the 8 T C/N value between before and after the high-temperature and high-humidity test were smaller in the optical recording medium in which both sides of the recording portion 18 were covered with the first covering portion 20 and the second covering portion 22, respectively, than in the optical recording medium in which only one side of the recording portion 18 was covered with the first covering portion 20 or the second covering portion 22.

In the case where only one side of the recording portion 18 was covered with the first covering portion 20 or the second covering portion 22, the change of the optimum recording power and the change of the 8 T C/N value between before and after the high-temperature and high-humidity test were smaller in the case where the recording portion 18 was covered with the second covering portion 22 than in the case where the recording portion 18 was covered with the first covering portion 20, even when the first covering portion 20 and the second covering portion 22 had the same thickness. The reason for the above can be considered as follows. Since the cover layer 16 was considerably thinner than the substrate 12, moisture entering from the cover-layer 16 side is more than moisture entering from the substrate 12 side. Therefore, an effect of suppressing moisture reaching the recording portion 18 is higher in the case where the cover-layer side of the recording portion 18 is covered with the second covering Moreover, even for the optical recording media of Comparative Examples each having the recording layer in which the composition ratios of constituent elements were constant throughout the recording layer were compared with each other, a difference of the 8 T C/N value between before and after the high-temperature and high-humidity test was smaller as the recording layer was thicker, as shown in Table 3. Thus, when the recording layer was formed to have a thickness of 130 nm or more, for example, degradation of the recording layer caused by moisture could be suppressed to some degree. However, in this case, a satisfactory value was not obtained for any of the initial C/N value and the C/N value after storage. In addition, such an excessively thick recording layer reduces production efficiency, resulting in increase of the cost of the optical recording medium.

Furthermore, even for the optical recording media of Comparative Examples each having the recording layer in which the composition ratios of constituent elements were constant throughout the recording layer, the difference of the 8 T C/N value between before and after the high-temperature and high-humidity test was smaller as the ratio of O in the recording layer was smaller. Thus, when the ratio of the atomic number of O to the total atomic number of Bi and O was set to be less than 63%, for example, degradation of the recording layer caused by moisture could be sufficiently suppressed. However, at such a small ratio of O, the C/N value was significantly small and it was therefore impossible to surely record data.

On the other hand, according to Working Examples, an optical recording media can be provided at a low cost, which can achieve appropriate optical characteristics without making a recording layer excessively thick and can have properties that are hard to degrade during storage.

Moreover, as the ratio of the atomic number of O to the total atomic number of Bi and O is higher, the sensitivity of the recording layer is higher. Thus, the sensitivity of the recording layer can be improved by increasing the ratio of the atomic number of O in the covering portion.

As described above, the optical characteristics and the storage property of the recording layer can be improved by forming the covering portion from a plurality of elements that have the optical characteristics and storage property in accordance with the composition ratios and by appropriately adjusting the composition ratios. Moreover, the recording portion and the covering portion can be formed in a common single chamber by making the constituent elements of the recording portion and the covering portion common to those portions. This can reduce the cost.

What is claimed is:

1. An optical recording medium comprising:
   a substrate; and
   a recording layer formed over the substrate, the recording layer having its optical characteristics changed by irradiation with laser light, wherein
   the recording layer includes a recording portion and a covering portion that covers at least one side of the recording portion in a thickness direction of the recording portion, the recording portion and the covering portion are substantially formed of Bi and O, and composition ratios of atomic number of Bi and O are different between the recording portion and the covering portion.

2. The optical recording medium according to claim 1, wherein
   a ratio of an atomic number of O to a total atomic number of Bi and O in the covering portion is smaller than that in the recording portion.

3. The optical recording medium according to claim 1, wherein
   a ratio of an atomic number of O to a total atomic number of Bi and O in the recording portion is 63% or more.

4. The optical recording medium according to claim 2, wherein
   a ratio of an atomic number of O to a total atomic number of Bi and O in the recording portion is 63% or more.

5. A method for manufacturing an optical recording medium comprising
   a recording layer deposition step of depositing a recording layer over a substrate by vapor deposition, the recording layer having its optical characteristics changed by irradiation with laser light,
   wherein the recording layer deposition step includes:
       a recording portion deposition step of depositing a recording portion substantially formed of Bi and O; and
       a covering portion deposition step of depositing a covering portion on at least one side of the recording portion in a thickness direction of the recording portion before and/or after the recording portion deposition step, the covering portion being substantially formed of Bi and O, composition ratios of Bi and O being different between the recording portion and the covering portion, and the recording portion deposition step and the covering portion deposition step are performed by using a common vapor deposition apparatus.

6. The method for manufacturing an optical recording medium according to claim 5, wherein:
   sputtering is performed as the vapor deposition;
   a target containing Bi is provided in a sputtering apparatus, an oxygen gas is supplied into the sputtering apparatus, and the recording portion deposition step and the covering portion deposition step are performed by means of the common sputtering apparatus by adjusting deposition condition including at least one of a flow rate of the gas and a deposition power.

* * * * *